Patented Feb. 23, 1937

2,071,496

UNITED STATES PATENT OFFICE 2,071,496

HIGHER AROMATIC KETO FATTY ACIDS AND PROCESS OF PRODUCING SAME

Herman A. Bruson, Philadelphia, Pa., Jack D. Robinson, Buffalo, N. Y., and Otto Stein, Philadelphia, Pa., assignors to The Resinous Products & Chemical Company, Philadelphia, Pa.

No Drawing. Application May 11, 1934, Serial No. 725,072

13 Claims. (Cl. 260—108)

This invention relates to new acids, and is a continuation in part of Ser. No. 478,564, filed Aug. 28, 1930 which has now matured into Patent No. 1,962,478, granted June 12, 1934.

More specifically it pertains to certain monobasic, ketonic acids and their process of preparation, said acids having the general formula:

$$R\text{—}CO\text{—}(C_nH_{2n-y})\text{—}COOH$$

where R represents any aromatic nucleus having an alkyl substituent possessing more than four carbon atoms; "n" is a whole number between 2 and 8 inclusive, and "y" is a value equal to 0 (zero) or 2.

Typical compounds which belong to the above class are the following acids, new substances, the preparation of which is described later herein:

1. $n=2$ { sec-amyl benzoyl-propionic acid,
   $y=0$ { sec-octyl toluyl-propionic acid,
2. $n=2$ { sec-amyl-benzoyl-acrylic acid,
   $y=2$ { sec-octyl-xyloyl-acrylic acid,
3. $n=4$ n-amyl benzoyl-valeric acid,
4. $n=8$ { sec-amyl-benzoyl-nonylic acid,
   $y=0$ { sec-octyl-toluyl-nonylic acid.

The above acids are readily prepared by condensing a suitable aromatic hydrocarbon having an alkyl substituent possessing more than four carbon atoms with the anhydride of an aliphatic dibasic acid, using preferably anhydrous aluminum chloride as the condensing agent. For example, the acids shown above were prepared as follows:

1. { Sec-amyl-benzoyl-propionic acid. From sec-amyl benzene and succinic anhydride.
   { Sec-octyl-toluyl-propionic acid. From sec-octyl-toluene and succinic anhydride.
2. { Sec-amyl-benzoyl-acrylic acid. From sec-amyl benzene and maleic anhydride.
   { Sec-octyl-xyloyl-acrylic acid. From sec-octyl xylene and maleic anhydride.
3. { n-Amyl benzoyl-valeric acid. From n-amyl benzene and adipic anhydride.
4. { Sec-amyl benzoyl-nonylic acid. From sec-amyl benzene and sebacic anhydride.
   { Sec-octyl toluyl-nonylic acid. From sec-octyl toluene and sebacic anhydride.

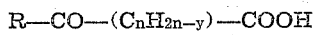

It is apparent that numerous homologues and isomers of these acids can be prepared by condensing other higher alkylated aromatic hydrocarbons with anhydrides of other aliphatic dibasic acids.

As illustrating the manner of preparing these acids, the following examples are given:

Example 1.—100 grams succinic anhydride were mixed with 875 grams of sec-amyl benzene and 295 grams of anhydrous aluminum chloride added in small portions at a time, keeping the temperature below 25° C. and stirring continuously. When the evolution of hydrogen chloride slackens the mixture is warmed to 50° C. for 5–6 hours until no more hydrogen chloride comes off. The reaction product is then decomposed by running it into a hot solution of excess sodium carbonate. The excess hydrocarbon is steam-distilled off, and the residue filtered to remove alumina. The filtrate upon acidification with dilute sulphuric acid forms a waxy precipitate consisting of crude sec-amylbenzoyl-propionic acid.

Instead of sec-amyl benzene, one may use n-amyl benzene, or mixtures thereof, in the above condensation.

By using 900 grams of sec-octyl benzene in the above condensation, and proceeding in an exactly analogous manner, the corresponding crude sec-octyl-benzoyl propionic acid is obtained as a yellowish wax.

Example 2.—98 grams maleic anhydride were mixed with 875 grams sec-amylbenzene and 295 grams of anhydrous aluminum chloride added in small portions keeping the temperature at 25–30° C. The mixture was then warmed at 50° C. with stirring and kept thereat until evolution of hydrogen chloride ceased. The reaction product was then run into ice-water to decompose the aluminum complex. The mixture was then steam distilled from dilute hydrochloric acid solution to remove the excess amyl-benzene. The residue is filtered and the oily material obtained is sec-amyl-benzoyl acrylic acid.

By using 900 gr. of sec-octyl xylene in the above condensation in place of the sec-amyl benzene, the corresponding crude sec-octyl xyloyl-acrylic acid is obtained as a resinous mass.

Example 3.—128 grams adipic anhydride are mixed with 650 grams of normal amyl benzene and 275 grams anhydrous aluminum chloride added while stirring. The mixture is heated to 55° C. on an oil bath until hydrogen chloride is no longer evolved. The reaction product is decomposed with a hot solution of sodium carbonate and the excess of amyl benzene is steam distilled off. The residue is filtered, and the filtrate acidified with dilute hydrochloric acid. A resinous mass of crude n-amyl benzoyl-valeric acid is precipitated.

Instead of n-amyl benzene, one may employ 900 grams of normal amyl naphthalene in the above condensation. There is obtained amyl-naph-thoyl-valeric acid.

*Example 4.*—194 grams of sebacic anhydride are condensed with 850 grams of sec-amyl benzene as described in Example 3, using 275 grams anhydrous aluminum chloride as condensing agent. The crude sec-amyl benzoyl-nonylic acid obtained forms a waxy mass.

Instead of the anhydrides mentioned, other anhydrides of dibasic acids such as glutaric anhydride, pimelic anhydride, suberic anhydride, and azelaic anhydride may be used.

The above acids are characterized in that their polyvalent metal salts, particularly their heavy metal salts such as the cobalt, manganese and lead salts are soluble in petroleum hydrocarbons of aliphatic or hydroaromatic nature, or in fatty oils, in contrast to those of the lower alkylated aroyl fatty acids in which the alkyl group contains less than five carbon atoms, the polyvalent metal salts of which are soluble only in aromatic hydrocarbons.

What we claim is:

1. The process comprising reacting on a nuclear alkylated aromatic hydrocarbon having more than four carbon atoms in an alkyl group, with the anhydride of an aliphatic dicarboxylic acid in the presence of anhydrous aluminum chloride.

2. The process comprising reacting on a nuclear alkylated aromatic hydrocarbon having more than four carbon atoms in an alkyl group, with the anhydride of an aliphatic dicarboxylic acid having the general formula $$(C_nH_{2n-y})(CO)_2O,$$

in which $n$ is any whole number from two to eight inclusive and $y$ is 0 (zero) or two, in the presence of anhydrous aluminum chloride.

3. The process comprising reacting on a nuclear alkylated aromatic hydrocarbon having more than four carbon atoms in an alkyl group, with succinic anhydride in the presence of anhydrous aluminum chloride.

4. The process comprising reacting on a nuclear alkylated aromatic hydrocarbon having more than four carbon atoms in an alkyl group, with maleic anhydride in the presence of anhydrous aluminum chloride.

5. The process of reacting on amyl benzene with succinic anhydride in the presence of anhydrous aluminum chloride.

6. An acid of the formula $$R—CO—(C_nH_{2n-y})—COOH$$

obtainable by the Friedel-Crafts condensation of an aliphatic dicarboxylic acid anhydride containing from 4 to 10 carbon atoms inclusive with an aromatic hydrocarbon containing a nuclear alkyl group of more than 4 carbon atoms.

7. An acid of the formula $$R—CO—(C_nH_{2n-y})—COOH$$

obtainable by the Friedel-Crafts condensation of an aliphatic dicarboxylic acid anhydride containing from 4 to 10 carbon atoms inclusive with an aromatic hydrocarbon of the benzene series containing a nuclear alkyl group of more than 4 carbon atoms.

8. An acid of the formula $$R—CO—CH_2—CH_2—COOH$$

obtainable by the Friedel-Crafts condensation of succinic anhydride with an aromatic hydrocarbon containing a nuclear alkyl group of more than 4 carbon atoms.

9. An acid of the formula $$R—CO—CH=CH—COOH$$

obtainable by the Friedel-Crafts condensation of maleic anhydride with an aromatic hydrocarbon containing a nuclear alkyl group of more than 4 carbon atoms.

10. An acid of the formula $$R—CO—CH_2—CH_2—COOH$$

obtainable by the Friedel-Crafts condensation of succinic anhydride with an aromatic hydrocarbon of the benzene series containing a nuclear alkyl group of more than 4 carbon atoms.

11. An acid of the formula $$R—CO—CH=CH—COOH$$

obtainable by the Friedel-Crafts condensation of maleic anhydride with an aromatic hydrocarbon of the benzene series containing a nuclear alkyl group of more than 4 carbon atoms.

12. An amylbenzoylpropionic acid obtainable by the Friedel-Crafts condensation of succinic anhydride with an amyl benzene.

13. An amylbenzoylacrylic acid obtainable by the Friedel-Crafts condensation of maleic anhydride with an amyl benzene.

HERMAN A. BRUSON.
OTTO STEIN.
JACK D. ROBINSON.